United States Patent [19]

Suppiah

[11] Patent Number: 5,157,005
[45] Date of Patent: Oct. 20, 1992

[54] SUPPORTED HIGH SILICA ZEOLITES

[75] Inventor: Sellathurai Suppiah, Pembroke, Canada

[73] Assignee: Atomic Energy of Canada Limited, Chalk River, Canada

[21] Appl. No.: 723,966

[22] Filed: Jul. 1, 1991

[30] Foreign Application Priority Data

Jul. 5, 1990 [CA] Canada .................. 2020482

[51] Int. Cl.$^5$ .................. B01J 29/32; B01J 37/02
[52] U.S. Cl. .......................... 502/62; 502/74
[58] Field of Search ..................... 502/62, 74

[56] References Cited

U.S. PATENT DOCUMENTS

| | | | |
|---|---|---|---|
| 3,198,240 | 8/1965 | Keith et al. | 158/116 |
| 3,236,806 | 2/1966 | Dunham, Jr. | 502/62 |
| 4,536,488 | 8/1985 | Wanke et al. | 502/159 |
| 4,552,744 | 11/1985 | Chuang et al. | 502/62 |
| 4,692,423 | 9/1987 | Caesar | 502/62 |

FOREIGN PATENT DOCUMENTS

| | | |
|---|---|---|
| 1175387 | 10/1984 | Canada . |
| 0141596 | 5/1985 | European Pat. Off. . |
| 0316159 | 5/1989 | European Pat. Off. . |
| 5067294 | 10/1973 | Japan . |
| 2019240 | 10/1979 | United Kingdom . |
| 2048945 | 12/1980 | United Kingdom . |

Primary Examiner—Carl F. Dees
Attorney, Agent, or Firm—J. A. Erratt; G. E. Fisk

[57] ABSTRACT

A process for applying a highly crystalline form of silica, for example Silicalite, to a supporting structure, with a small thermal mass, such as a screen or a metal surface is described. A slurry of finely-divided high silica zeolite and a silicone or polytetrafluoroethylene binder is coated onto the support structure. Optionally, a noble catalyst is applied to the high silica zeolite either before or after the high silica zeolite is coated onto the support structure. The support structures coated according to this process can be used to catalyze flameless combustion of hydrogen or hydrocarbon gases with suitable amounts of air or oxygen if a noble metal catalyst is applied, or as an adsorbent structure in the absence of the metal catalyst.

21 Claims, 1 Drawing Sheet

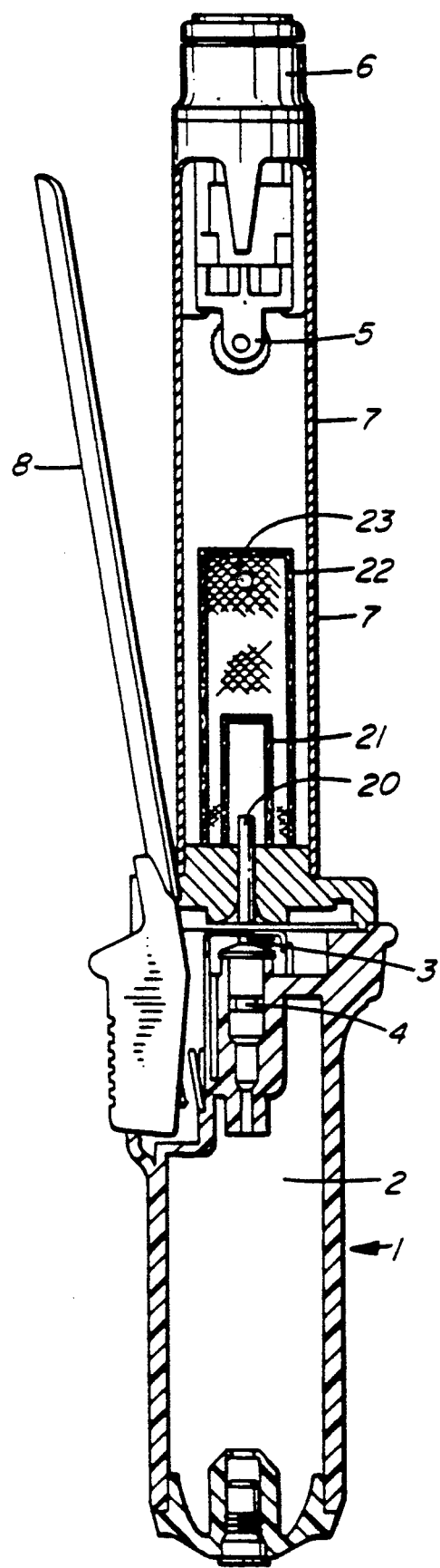

SUPPORTED HIGH SILICA ZEOLITES

The present invention provides a technique for applying a highly crystalline silica material (hereinafter abbreviated "HC silica") to a supporting structure, such as a screen or a metal strip or plate which has small thermal mass. The HC silica adheres firmly once applied, and can then be used in a variety of catalytic operations. The noble metal catalyst can be applied to the HC silica either before or after it is attached to the screen or metal strip or plate substrate.

BACKGROUND OF THE INVENTION

Noble metal catalysts on support materials are widely used in industry. Such catalysts are used to catalyse the combustion of a wide variety of gases, and are also used as the heat producing elements in heaters, small domestic appliances and the like. They are also useful in pollution control environments, where waste combustible gases must be disposed of. In typical applications, a noble metal catalyst such as platinum, palladium, iridium, or another group VIII noble metal, or a mixture of more than one metal, is placed on a finely divided support material. The finely divided support material is necessary so that the expensive noble metal will be exposed to as much of the gas flow as possible.

The finely divided support material must in turn be supported in some way. It can form part of a free standing porous composite material, such for example as disclosed in European published application number 0316 159 of Suppiah, published May 17, 1989. Alternately, it can be disposed on the surface of a massive ceramic material or extruded into a monolith. However, in both of these cases, heat travels from the reactions site of the combustible gas on the noble metal through the supporting structure. This tends to reduce the temperature of the noble metal catalyst, and may reduce it below the temperature where combustion may continue. Thus, it is often necessary to heat up the support, so that it will not withdraw heat and interrupt the combustion reaction.

It is therefore desirable to have light weight support materials with little thermal mass. For this reason, porous support materials are sometimes coated onto aluminum strips, and the noble metal catalyst is then applied to the support material. In at least one case, alumina has been formed on a screen, by coating the screen with aluminum hydroxide and then calcining the aluminum hydroxide to alumina. This gives rise to an alumina supporting material on a screen, which presumably has little thermal mass. See Japanese published application number 50-67294 of Eguchi. It has been known to attach alumina to an asbestos cloth, by spraying. See U.S. Pat. No. 3,198,240 of Keith. Painting has been disclosed to apply cobalt silicate to a screen for catalytic purposes. See British published application 2048945.

In recent years several highly crystalline forms of silica, which have zeolite type structures, have been developed. These will be described herein by the term "High Silica Zeolites". They have very high molar silica content, having a molar ratio of silica to alumina of greater than 10:1 and preferably greater than 20:1. They are intrinsically hydrophobic and remain stable at temperatures, in excess of 500° C. One example of such high silica zeolite is silicalite, marketed by Union Carbide Corp., the preparation of which is described in U.S. Pat. No. 4,061,724 of Gosse. Other such zeolites are the ZSM series (ZSM-5, ZSM-8, ZSM-11 and ZSM-12) marketed by Mobil Oil Corp. These zeolites are disclosed in U.S. Pat. No. 3,702,866; U.K. patent 1,334,243; U.S. Pat. No. 3,707,979 and U.S. Pat. No. 3,842,449 respectively. Another high silica zeolite is called "ultrastabilized Y" and is described at American Chemical Society, *Advances in Chemistry Series* 101 266-278 (1971).

The hydrophobicity of high silica zeolites make them desirable materials for use as support for a noble metal catalyst. Also, they function alone as effective adsorbents for organic compounds. However, no techniques exist for applying high silica zeolites to the surface of a larger support particularly one of small thermal mass. High silica zeolites do not adhere in a permanent fashion to a metal screen or surface when painted or sprayed on, or when a screen surface is dipped into a high silica zeolite slurry.

According to the present invention, high silica zeolites can be attached to screens, strips or plates of glass fibre.

It has been known in some cases to use polytetrafluoroethylene (PTFE) in association with a high surface area catalyst support substrate. See for example U.S. Pat. No. 4,536,488 (Wanke). However, this has involved coating of a catalyst support material with PTFE. The binder PTFE tends to cover the pores of the support, therefore making it have less surface area, and hence not be as good a support material for noble metal catalyst. Although the present invention can in one embodiment make use of PTFE, much smaller amounts are used than in the Wanke process, and these amounts are preferably removed by calcining.

SUMMARY OF THE INVENTION

According to the invention, a screen or metal surface such as a strip or plate, is coated with a high silica zeolite by dipping a screen made of glass fibre or metal or a metal surface into a slurry of a high silica zeolite and a silicone or polytetrafluoroethylene (PTFE) binder or binding agent or by painting or spraying such a slurry onto the screen or metal surface. It the binder is silicone, the slurry is formed in an organic solvent. If the binder is polytetrafluoroethylene, the slurry is preferably (although not necessarily) formed in water. The screen, or metal surface is dipped into the slurry once or several times, to permit to the adhering of the slurry to the screen. Usually, it is not preferred to dip more than about three times, as the slurry will tend to run off with repeated dippings, so that advantages are not obtained by a larger number of dippings than about three. Optionally, the screen or metal surface is then passed over a sharp edge to remove some of the slurry. The screen or metal surface is then dried and optionally calcined. The calcining burns off the silicone or polytetrafluoroethylene binder, so that no binder or only relatively small amounts of binder residue remains. This reduces or prevents occlusion of the pores of the high silica zeolite. Surprisingly, following calcining, the high silica zeolite continues to adhere firmly to the screen material. This is particularly notable when the binder is silicone. When a PTFE binder is calcined off, the bond is less firm, and the zeolite can be detached by hard shaking.

Non-calcined screens are useful for low temperature operation. For example a Silicalite - PTFE - screen catalyst can be used at an operating temperature of less than 400° C. At temperatures above this, the PTFE will calcine off during operation.

The invention also comprises a screen or metal surface having a high silica zeolite bonded to it, and such a screen with a noble metal catalyst attached to the high silica zeolite. Such screens are useful in catalysis applications, particularly where it is important to have a catalyst support with a low thermal mass. The preferred high silica zeolite for use in the invention is silicalite, produced by Union Carbide Corp.

DESCRIPTION OF THE DRAWING

The invention will be described further with reference to the drawing, which shows a conventional hair curler, partially cut away, and modified in accordance with the invention.

DETAILED DESCRIPTION OF THE INVENTION

The invention may be used to coat a high silica zeolite onto screens, plates or strips of glass fibre, or metals. Although the invention can be used to coat screens or surfaces of such metals as copper or zinc or iron if desired, generally it is not desired to coat such metals. The reason for this is that the screens or coated surfaces of the present invention are particularly useful in catalysis. If the metal is a reactive one, then it will tend to interfere with many catalytic reactions by poisoning the catalyst or by entering a completing reaction. Thus, if a screen of copper coated with high silica zeolite and a noble metal were used as a catalyst for the combustion of hydrocarbon gases with air or oxygen, the screen would tend to react at the combustion temperatures with the oxygen to form cuprous or cupric oxide.

It is therefor preferred that the metals be relatively inert, particularly to oxygen. Preferred metals include stainless steel, "Inconel" (TM) steel (an alloy of nickel, chromium and iron), aluminum, mild steel or carbon steel and nickel.

Screens with aperture sizes from 20 mesh to about 400 mesh are useful in this invention. (All mesh sizes n this disclosure are U.S. Sieve Sizes). In general, it is preferred to use screens having mesh sizes from 100 mesh to 350 mesh. Particularly useful metallic surfaces include metal strips or plates of aluminum or steel which are under 0.050 mm in thickness, as these have relatively little thermal mass.

The screen or metal surface is prepared for use by being cleaned and degreased. Degreasing can be carried out by washing thoroughly with an organic degreasing agent (for example FASOLV (TM) degreaser, manufactured by National Laboratories, a division of Sterling Drug Ltd.). If desired, the degreasing can be followed by heating of the screen or metal surface at an elevated temperature to remove any adsorbed matter. A temperature above 300° C. is preferred. For example, a screen may be heated for 30 minutes in a furnace at 500° C.

The screen or metal surface is coated with a slurry of high silica zeolite and with the PTFE or silicone binder. The high silica zeolite should have a high surface area, i.e. more than 50 $m^2/g$ and preferable more than 100 $m^2/g$ so that it will function well as an adsorbent or catalyst support. They are present as finely divided particles. The particle size is not critical. When used to coat screens, however, it is preferred that they be considerable smaller than the screen mesh, so that, when the coated screen is sued as an adsorbent or a catalyst support, the particles will not block free flow of fluid through the screen.

The screen or metal surface is coated by dipping into a slurry containing from 5% to 40% (by weight of solvent) of high silica zeolite in water or an organic solvent together with from about 3% to about 40% by weight of solvent of a silicone or PTFE. The particular solvent used is not critical, provided that it is inert to the screen material or metallic surface. With PTFE, it is preferred that the solvent be water, as PTFE is commercially available as a dispersion in water. If desired, the slurry can be painted onto the screen with a brush or sprayed on with conventional spraying equipment instead of dipping.

The optional application of a noble metal catalyst to the high silica zeolite can take place at several different stages of the process. For example, if it is desired to apply the noble metal catalyst after the screen or metal surface has been coated with the zeolite, this can be done by dipping the coated screen or metal surface into a solution of a noble metal acid such as chloroplatinic acid in water or ethyl alcohol. The screen or metal surface is dipped at ambient or near ambient temperature as many times as are necessary to obtain a coating of the acid on the surface of the zeolite. Following the dipping, the screen or metal surface is dried and optionally calcined. If the screen or metal surface is to be calcined it is placed in a furnace and heated under air or helium followed by reduction in hydrogen, to reduce the noble metal oxide, to give a catalytic metal remaining on the surface of the zeolite. The dipping, heating and reduction steps are known for putting noble metals on support materials per se. Suitably, the heating in air or helium is to a temperature above 150° C. or higher for 120 minutes, and the reduction in an atmosphere of hydrogen is at a temperature of 150° C. for 120 minutes. The catalyst may then be passivated if desired by heating in an inert gas with a small amount, i.e. about 2%, of air in it, at a temperature of 150° C.

An alternate method of introducing the noble metal catalyst is by applying the noble metal to the high silica zeolite prior to the coating on the screen. This can be carried out by known methods for applying a noble metal to a powdered carrier material, such as for example by soaking it in a aqueous solution of a chloride salt of the noble metal at an alkaline pH. See for example Wanke et al U.S. Pat. No. 4,536,488. The slurry is then formed of the metallized zeolite.

In a further alternative method, a chloroplatinic acid salt or other salt of a noble metal acid can be added to the slurry of high silica zeolite prior to the addition of the binder and coating of the screen. This permits the salt to be deposited uniformly on the zeolite, which is then coated on the screen. The coated screen can then be calcined in helium and then reduced in hydrogen as discussed above.

Typically the slurry of high silica zeolite is made by agitating the zeolite (either before or after the addition of the noble metal, as discussed above) in water or an organic solvent. Organic solvents include xylene, toluene, or benzene. The preferred high silica zeolite is Silicalite S-115, provided by Union Carbide Corporation. The Silicalite has a surface area of about 430 $m^2$. By calcining, the surface area can be adjusted.

A particularly preferred PTFE binder is Teflon 30 (TM) made by E.I. Dupont de Nemours Co. This is preferred because it is a dispersion of finely divided PTFE particles in water. This avoids the difficulty of bringing the PTFE particles into a slurry, as the preexisting PTFE dispersion can be added to a water-based slurry of Silicalite, and agitated to blend the two.

The choice of the silicone binder is not critical. Experimentation should be carried out to verify that the particular silicone binder being used functions effectively to bind the high density zeolite to the screen in the solvent being used. A further consideration in using silicones is the temperature at which the silicone will burn off. Generally, silicones which burn off at lower temperatures are preferred, as they can be removed more easily during the calcining step, thereby uncovering pores of the Silicalite which might otherwise have been concealed by the binder. A particularly preferred silicone is Dow Corning resin 805, available from Dow Corning Company. This is a 50% solution of silicone in xylene.

Once a slurry of binder and high silica zeolite is formed, this may be applied to the screen support either by painting on the metal surface, dipping or spraying. The preferred method is dipping. The support is lowered into the slurry and is withdrawn from the slurry in such a way that excess slurry is removed evenly from it. This can be achieved by pulling the support over a sharp edge, or by shaking the support gently after removal. If the slurry has been brushed on, the support can also be shaken or pulled over an edge to remove excess slurry.

Following the coating step, the support is allowed to air dry. If desired, the air used for drying can be heated. However, if the air is heated too much, the drying may be accelerated to a point where the coating blisters. It is therefore preferred to dry at ambient temperature or at a temperature not exceeding about 100° C. Once drying has been substantially completed, the temperature can be raised to calcine the coating. Calcining is accomplished by heating in air. For example, heating to 250°–500° C. for periods from 3 hours (at 250° C.) to 20 minutes (at 500° C.) is suitable.

If desired, the support may be calcined and then dipped a second time into the high silica zeolite and binder slurry and again air dried. It is possible to coat more than twice, but a better coating occurs when three or fewer dips are done. The support can be weighed before and after coating to determine how much zeolite and binder slurry has adhered. Generally, it is desired to have a weight of zeolite and binder equivalent to at least about 5% of the screen weight adhere so that sufficient Silicalite is available to support a desired amount of noble metal catalyst for catalytic combustion. However, in some cases, a smaller amount of zeolite can be tolerated. Usually it is desirable to delay the calcining step until after the screen coating has dried.

Non-calcined screens are useful for low temperature operation, for example less than 400° C. for a Silicalite-PTFE screen catalyst. Following the application of the high silica zeolite on the screen or metal surface the screen or metal surface is cured by heating at a temperature up to 375° C.

The preferred catalyst is platinum, although other Group VIII noble metal catalysts known in the art, such as palladium, iridium or mixtures of any of these metals with each other or with another Group VIII metal, can be used.

Screens or metal plates coated according to the invention can be used to catalyze flameless combustion of hydrogen, or hydrocarbon gases such as butane and propane, or lower alcohols such as methanol or ethanol or lower aldehydes and ketones such as formaldehyde and acetone or gasoline, all with suitable amounts of air or oxygen. In the case of hydrogen, CO and methanol, the catalyst does not need to be preheated. In the case of the other compounds mentioned, some preheating may be necessary.

EXAMPLE 1

A flat piece of 100 mesh stainless steel screen, 51 mm wide by 356 mm long and a piece of 100 mesh stainless steel screen, 51 mm wide by 305 mm long with corrugations 1.5 mm deep were each degreased with a commercially available degreasing solvent, (FASOLV) (TM). The two pieces of stainless steel where then rinsed with water and heated in air at 600° C. for two hours to remove possible contaminants. Silicalite S-115, having a surface area of 435 $m^2/g$ and a particle size of 1.5 $\mu m$ was platinized using known methods to a platinum loading of 6.3% by weight. A slurry was made of the Silicalite by mixing 12 grams of the platinized Silicalite with 15 $cm^3$ of water, agitating, and mixing in 2.51 g of Teflon 30 (TM) suspension, which is a 60% suspension of PTFE in water. The two screens were dipped into the slurry and were allowed to air dry at ambient temperature. The temperature was then gradually raised over a seven hour period to 240° C. Following this, the temperature was raised to 375° C. and the screens were maintained at that temperature for 30 minutes.

Once the screens had cooled to room temperature, they were each rolled into a 26 mm diameter cylinder. When used in a hair curler the PTFE would be burned off during use.

EXAMPLE 2

A piece of 28 mesh stainless steel screen was rolled into a cylinder, 9 mm diameter and 35 mm long. The shape was maintained by spot welding along the length. One end of the module was welded to a ring which had a 2 mm lip on its inner edge and a 9 mm inner diameter. The ring's outer diameter was 15 mm.

Silicalite S-115 was platinized using known methods to approximately 10% by weight of platinum. A Silicalite suspension was then made by dispersing the platinized Silicalite in xylene. The suspension contained 2 g of Silicalite in 5 g of xylene. An ultrasonic cell disrupter was used to aid dispersion. Silicone equal to 20% by weight of the amount of Silicalite was added to the dispersion, and the mixture was again dispersed using the ultrasonic cell disrupter. The disrupter was used until a uniform slurry resulted. The screen cylinder was then dipped into the slurry and allowed to dry in air for a few minutes. Following this, it was calcined in air at 250° C. for 180 minutes, to burn off the silicone. Initial and final weights of the module were 0.6370 g and 0.7108 g respectively.

EXAMPLE 3

The procedure of Example 1 was followed using a non corrugated screen of the type described in Example 1. The slurry was painted onto the screen instead of dipping as was done in Example 1. Painting was done using a small artist's paintbrush. The initial and final weights of the screen were 0.4242 g and 0.4467 g respectively. The screen was rolled into a cylinder having a diameter of 9 mm.

EXAMPLE 4

A commercially available hair curler sold under the name BRAUN CLICKER (TM) was modified by removal of the existing platinized quartz wool catalyst and its support. The curler was then further modified as shown in the drawing. After removal of the quartz wool catalyst and its support, the hair curler consisted of handle 1 containing a butane cylinder 2, a butane nozzle assembly 3 having a venturi tube 4 to entrain air in the butane to provide a butane-air mixture, and a nozzle 20, a flint igniter mechanism 5 to create a spark upon turning knob 6 is a barrel 7 about which the hair was designed to be wrapped and a clamp 8 to hold the hair in place.

Into the curler was welded a stainless steel gas diffuser screen cylinder 21 of 325 mesh (all mesh sizes are U.S. Sieve Sizes) having a diameter of 0.6 cm and a length of 1.2 cm. The cylinder was welded with its open bottom end over the venturi tube 4. The cylinder was closed at its upper end by a welded end piece formed of a disc of 325 mesh screen. The catalyst cylinders made in each of Examples 1 to 4 were then tested as catalyst for combustion of butane using this modified hair curler. Each of the catalysts was in turn placed over the diffuser 21 and secured in place. The catalyst cylinder was closed at its upper end and four holes 23 of 2 mm diameter were drilled at 90° intervals around the catalyst cylinder 2.5 mm from the upper end. The hair curler was then reassembled for testing of each catalyst in turn, by putting the barrel 7 back into place.

In each case, when the curler was turned on and the igniter 5 was operated, a flame was visible, but it disappeared in a few seconds. Catalytic combustion then continued in a satisfactory manner. The combustion temperatures using the catalyst of examples 1 to 4 were all in the range from 130° C. to 160° C. with an average of approximately 140° C. In all cases, the curler was usable for hair curling.

EXAMPLE 5

Air was bubbled through methanol at approximately 21° C. to entrain methanol vapour. The air, with the entrained vapour, was passed through a 1"×1" square cut from the flat screen of Example 1. A thermocouple was placed in contact with the screen to measure its temperature. The temperature rose rapidly, although no flame was visible. When he temperature reached 100° C., the sypply of methanol was discontinued to avoid possible explosion and flashback of flame to the methanol supply. The temperature rise showed that the screen functioned effectivley as a catalyst for the catalytic combustion of methanol. The same procedure was then used with the corrugated screen of example 1, giving the same result.

EXAMPLE 6

Silicalite S-115 was platinized to approximately 9% Pt by the conventional rotary evaporation method. Then, 1% iridium was deposited on the platinized Silicalite by placing 15 g of the platinized Silicalite in a 250 ml round bottom flask. A solution containing 0.375 g of hexachloroiridic acid in 27.5 ml ethanol was added to the flask and this mixture was placed on a rotary evaporator. The excess alcohol was evaporated at 70° C. and the Silicalite was heated to 100° C. for 1 hour to ensure dryness. Following this, the Silicalite was heated to 200° C. in flowing helium for 1½ hours and reduced with hydrogen at 200° C. for 2 hours.

This material was formed into a slurry by mixing 20 g of its plus 8 g of silicone resin (Dow Corning 805, which contains 50% silicone) in 15 g of xylene, and disrupting with a sonic disrupter. Four 100 mesh stainless steel screens where degreased with FASOLV (TM) degreasing solvent, rinsed with water and then heated in air at 500° C. for 2 hours to form a slurry. The slurry was painted onto the four screens and the screens were allowed to dry. The painted screens were then placed in an oven at room temperature and cured by heating to 250° C. for 2 hours and then to 400° C. for 15 minutes. The following table lists the catalysts and their initial and final weight:

| Catalyst Description, KK-441 | Initial Wt. (g.) | Final Wt. (g) |
| --- | --- | --- |
| Flat, 103 by 350 mm | 12.0379 | 12.8997 |
| Half Corrugated, 50 mm wide | 10.7642 | 11.5136 |
| Half Corrugated, 25 mm wide | 4.7425 | 5.0683 |
| Half Corrugated, 25 mm wide, 1 notch | 4.1090 | 4.4068 |

Each of these screens was tested as set out in Example 6 and it was found that the temperature of each screen, when used as Example 5, rose to 100° C., demonstrating that the screen functioned effectively as a catalyst for the catalyst combustion of methanol.

EXAMPLE 7

Silicalite S115 was platinized to 6.3% Pt, using an ion exchange method. The amount of PTFE present was approximately 10% by weight of the platinized Silicalite. Two steel screens of 100 mesh (U.S. screen sizes) where provided. One was flat and the other had corrugations of 1.5 mm depth. Each was degreased using FASOLV (TM) degreasing solvent, and was calcined at 600° C. for 1 hour. Each was then dipped into the slurry and air dried to coat it. The coated screens were heated for 7 hours at a temperature rising gradually from 100° C. to 240° C. A final calcination was done at 365° C. for 0.5 hours to cure the PTFE. The coated screens were then heated to 300° C. and exposed to a stream of helium saturated with chlorotrimethyl silane at 25° C. for 1 hours, to silylate them. Following the silylation, the temperature was lowered to 200° C. and the screens were reduced with hydrogen for 1.5 hours to remove any residual chlorine.

Each of the two screen was then tested in a hydrogen recombination tube reactor, into which a stream of 3,000 ppm of hydrogen in air was fed. The hydrogen content at the inlet and outlet of the reactor was monitored. The reaction took place at 20° C. The reactor rate was found for both catalysts to be approximately 9.63 cm$^3$(H$_2$) s$^{-1}$ g$^{-1}$ Pt. The reaction was then continued with the hydrogen being saturated with water vapour at 30° C. to produce a really wet environment in the reactor. The reaction rate was measured as being 0.516 cm$^3$(H$_2$) s$^{-1}$ g$^{-1}$ (Pt).

This test shows that the catalyst according to the invention can be silylated, and that the silylated catalyst is effective to catalyze hydrogen and oxygen to combine into water. Although the reaction rate dropped when the environment was made wet, a significant reaction rate still occurred. This shows that the catalyst of the invention is capable of functioning under wet conditions, although not at as high a rate as under dry conditions.

EXAMPLE 8

A slurry was prepared of platinized Silicalite in xylene, using an ultrasonic disrupter. The Silicalite contained approximately 6.3% platinum. Dow Corning 805 (TM) silicone resin was then added to the slurry in an amount to give 10% of silicone by weight of the platinized Silicalite, and the mixture was again disrupted to make a uniform slurry. This slurry was used to paint one flat stainless steel 100 mesh screen 25.4 cm square. The screen was air dried and then heated over a temperature range of 100°-235° C. for a period of 6 hours. The temperature was then increased to 400° C. and maintained at this level for 15 minutes. The catalyst was silylated as set out in Example 7 and tested for hydrogen oxygen combination as set out in Example 7. The reaction rate under dry conditions was found to be 2.79 cm$^3$ (H$_2$) s$^{-1}$ g$^{-1}$ (Pt). The reaction rate under wet conditions was found to be 0.626 cm$^3$ (H$_2$) s$^{-1}$ g$^{-1}$ (Pt).

This Example demonstrates that an effective hydrogen oxygen combination catalyst can be prepared by painting a screen with a slurry of Silicalite and silicone, and subsequently silylating.

EXAMPLE 9

A slurry was prepared with 5.03 g of platinized Silicalite which had 10% platinum on the Silicalite, 12.51 g of xylene and 2.6 g of Dow Corning silicone resin 850. This was used to paint three stainless steel sheets. The sheets were then heated at a temperature gradually increasing from 100° C. to 235° C. for 2 hours, and were then calcined at 400° C. for 15 minutes. The same slurry was sprayed on three sheets having similar dimensions to those painted, and the sprayed sheets were likewise calcined.

Each of these sheets were tested as a catalyst by passing methanol vapour over it in a manner similar to that set out in Example 5. Each exhibited a temperature rise to 100° C., showing that it effectively catalyzed the oxidation of methanol. This example demonstrates the coating of metal sheets with a slurry containing silicone, and the use of such sheets in catalysis.

EXAMPLE 10

Example 9 was repeated, except that a slurry was prepared using 5.00 g of platinized Silicalite (10% Pt on Silicalite), 6.5 g of water and 1.68 g of Teflon 30 (a dispersion of 60% PTFE in water.) Three stainless steel sheets were painted with the slurry and cured as in Example 7. furthermore, three stainless sheets were sprayed with the slurry and cured as set out in Example 7. Each of the six sheets catalyzed methanol oxidation, as shown by a rise in temperature to 100° C., when tested as in Example 9. This example demonstrates the coating of metal sheets with a slurry containing PTFE, and the use of such sheets in catalysis.

EXAMPLE 11

Platinum (10%) was impregnated on Silicalite S115 and calcined at 250° C. in a stream of helium for 1.5 h and reduced in a stream of hydrogen at 250° C. for 2 h. The platinized powder was then made into a slurry (1:2.5: 0.22 Pt - S115: xylene:silicone) and painted on 100 mesh screen. Calcination was done at 235° C. for 3 h and at 400° C. for 15 min. The resulting catalyst contained 0.92% Pt. Test for hydrogen/oxygen recombination gave a catalytic rate of 1.02 cm$^3$ (H$_2$) s$^{-1}$ g$^{-1}$ (Pt). This example demonstrates hydrogen/oxygen recombination that does not involve silylation.

The foregoing disclosure is for the purpose of exemplification only, and further modifications of the invention will be obvious to a person skilled in the art.

The embodiments of the invention in which an exclusive property or privilege is claimed are defined as follows:

1. A catlaytic structure comprising a supporting structure, with a small thermal mass, selected from a screen or a metallic surface, said supporting structure being coated with at least 5% by its weight of a high silica zeolite having a silica/alumina ratio of at least 10:1, wherein said catalytic structure being formed by coating said supporting structure with a slurry of said high silica zeolite and binding agent.

2. A structure as set out in claim 1 wherein the high silica zeolite is Silicalite S-115.

3. A structure as claimed in claim 1 wherein the screen has a mesh size from U.S. Sieve Size 25 to U.S. Sieve Size 400.

4. A structure as claimed in claim 1 wherein the binding agent is selected from the group consisting of polytetrafluoroethylene and a silicone.

5. A structure as claimed in claim 1 wherein the supporting structure is made from a material selected from the group consisting of glass fibre, stainless steel, metal alloys, aluminum, carbon steel and nickel.

6. A structure as claimed in claim 1, additionally comprising a catalytic amount of a noble metal catalyst on the high silica zeolite.

7. A structure as claimed in claim 6, wherein the noble metal is selected from platinum, palladium, iridium or mixtures thereof.

8. A structure as claimed in claim 1, wherein the structure is calcined to remove a substantial portion of the binding agent.

9. A process of producing a catalytic structure comprising the steps of:
    a) providing a supporting structure with a small thermal mass, selected from a screen or a metallic surface;
    b) coating the supporting structure with a slurry comprising a solvent selected from the group consisting of water or an organic solvent, from 5% to 40% by weight of solvent of a high silica zeolite having a ratio of silica to alumina of at least 10:1 and 3% to 40% by weight of solvent of a binder; and
    c) drying the coated support structure to remove the solvent.

10. A process as claimed in claim 9 in which the high silica zeolite is Silicalite S-115.

11. A process as claimed in claim 9, wherein the binding agent is selected from silicone and polytetrafluoroethylene.

12. A process as claimed in claim 9, further comprising:
    d) calcining the dried coated support structure by heating from about 250° to 500° C. for about 20 minutes to about 3 hours.

13. A process as claimed in claim 9, wherein the organic solvent selected from the group consisting of xylene, toluene and benzene.

14. A process as claimed in claim 9, wherein the screen has a mesh size from U.S. Sieve Size 30 to U.S. Sieve Size 400.

15. A process as claimed in claim 14, wherein the screen has a mesh size from U.S. Sieve Size 100 to U.S. Sieve Size 350.

16. A process as claimed in claim 9, wherein the supporting structure is made from material selected from the group consisting of glass fibre, stainless steel, metal alloys, aluminum, carbon steel and nickel.

17. A process as claimed in claim 9, additionally comprising the step of applying a catalytic amount of a noble metal catalyst to the high silica zeolite.

18. A process as claimed in claim 17, in which the noble metal is applied after the high silica zeolite has been coated onto the support structure.

19. A process as claimed in claim 17, in which the noble metal is applied to the high silica zeolite while the high silica zeolite forms part of said slurry.

20. A process as claimed in claim 17, wherein the noble metal is selected from paltinum, palladium, iridium or mixtures thereof.

21. A catalytic structure comprising a supporting structure, with a small thermal mass, made from material selected from the group consisting of glass fibre, stainless steel, metal alloys, aluminum, carbon steel and nickel, said supporting structure being coated with at least 5% by its weight of Silicalite S-115, wherein said catalytic structure being formed by coating said supporting structure with a slurry of said Silicalite and a binding agent selected from the group consisting of polytetrafluoroethylene and a silicone; wherein the catalytic structure additionally comprises a catalytic amount of a noble metal catalyst on said Silicalite, wherein the noble metal is elected from the group consisting of platinum, palladium, iridium and mixtures thereof; and wherein the catalytic structure is calcined to remove a substantial portion of the binding agent.

* * * * *